United States Patent
Borate et al.

(10) Patent No.: US 12,441,404 B2
(45) Date of Patent: Oct. 14, 2025

(54) STRUCTURAL ASSEMBLY HAVING ANGLED DEFLECTOR

(71) Applicant: Ford Global Technologies, LLC, Dearborn, MI (US)

(72) Inventors: Pradeep Borate, Novi, MI (US); Bhimaraddi Venkaraddi Alavandi, Canton, MI (US); Lalitha Gade, Canton, MI (US); Venkateswaran Ramanarayanan, Canton, MI (US); Harshavardhan Virinchipuram Kylas, Lincoln Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 18/078,452

(22) Filed: Dec. 9, 2022

(65) Prior Publication Data

US 2024/0190506 A1    Jun. 13, 2024

(51) Int. Cl.
*B62D 21/15* (2006.01)
*B62D 21/03* (2006.01)
*B62D 21/11* (2006.01)

(52) U.S. Cl.
CPC .......... *B62D 21/152* (2013.01); *B62D 21/03* (2013.01); *B62D 21/11* (2013.01)

(58) Field of Classification Search
CPC ......... B60R 19/02; B60R 19/24; B62D 21/00; B62D 21/02; B62D 21/03; B62D 21/11; B62D 21/152; B62D 27/02; B62D 27/023
See application file for complete search history.

(56) References Cited

U.S. PATENT DOCUMENTS

| | | | |
|---|---|---|---|
| 7,380,876 B1 * | 6/2008 | Barthelemy | B62D 25/00 52/843 |
| 9,233,716 B2 | 1/2016 | Midoun et al. | |
| 9,376,144 B2 | 6/2016 | Shaner et al. | |
| 9,457,746 B1 | 10/2016 | Baccouche et al. | |
| 9,555,754 B2 * | 1/2017 | Hara | B60R 19/34 |
| 9,821,740 B2 * | 11/2017 | Jordan | B60R 19/023 |
| 9,944,324 B2 * | 4/2018 | Asai | B62D 21/152 |
| 11,292,522 B2 | 4/2022 | Gombert et al. | |
| 2009/0302591 A1 | 12/2009 | Auer et al. | |
| 2014/0062129 A1 * | 3/2014 | Syed | B62D 21/152 296/187.1 |
| 2015/0246691 A1 | 9/2015 | Volz et al. | |

* cited by examiner

*Primary Examiner* — Lori Lyjak
(74) *Attorney, Agent, or Firm* — Burris Law, PLLC (57) ABSTRACT

A structural assembly for a vehicle includes a left frame, a right frame, a cross beam, a bumper structure, and a pair of deflectors. The left frame rail and the right frame rail are spaced apart from each other and extend in a longitudinal direction of the vehicle. The cross beam extends in a transverse direction and connects the left and right frame rails to each other. The bumper structure extends in the transverse direction and is secured to front ends of the left frame rail and the right frame rail. Each deflector includes a rear end secured to an outboard wall of a respective left and right frame rail and a front end secured to a respective end of the bumper structure. Each deflector is angled in a forward direction of the vehicle from a location adjacent to the cross beam.

20 Claims, 7 Drawing Sheets

STRUCTURAL ASSEMBLY HAVING ANGLED DEFLECTOR

FIELD

The present disclosure relates to a structural assembly having a deflector and a vehicle including a structural assembly having a deflector.

BACKGROUND

The statements in this section merely provide background information related to the present disclosure and may not constitute prior art.

Most modern vehicles are be designed to have structures, for managing energy with controlled and limited deformation to the vehicle during events such as a head-on and overlap frontal impacts. The impact performance of the vehicle and its various structures, assemblies, and components may be assessed using a variety of crash tests. One known industry test is the small overlap rigid barrier (SORB) test in which the vehicle travels at a predetermined speed toward a rigid barrier and only an outer portion of the vehicle width is impacted into the barrier. Small overlap or offset frontal impacts primarily affect an outer portion of the vehicle, which may not include primary load carrying structure.

The teachings of the present disclosure address small overlap and other loading conditions on a vehicle during operation.

SUMMARY

This section provides a general summary of the disclosure and is not a comprehensive disclosure of its full scope or all of its features.

In one form, the present disclosure provides a structural assembly for a vehicle that includes a left frame, a right frame, a cross beam, a bumper structure, and a pair of deflectors. The left frame rail and the right frame rail are spaced apart from each other and extend in a longitudinal direction of the vehicle. The cross beam extends in a transverse direction and connects the left and right frame rails to each other. The bumper structure extends in the transverse direction and is secured to front ends of the left frame rail and the right frame rail. Each deflector includes a rear end secured to an outboard wall of a respective left and right frame rail and a front end secured to a respective end of the bumper structure. Each deflector is angled in a forward direction of the vehicle from a location adjacent to the cross beam.

In variations of the structural assembly of the above paragraph, which may be implemented individually or an any combination: each deflector of the pair of deflectors has a variable cross-section; the rear end of each deflector has a cross-sectional area that is greater than a cross-sectional area of the front end of each deflector; each deflector includes an intermediate portion disposed between the rear end and the front end, the intermediate portion has a cross-sectional area that is greater than the cross-sectional area of the front end and greater than the cross-sectional area of the rear end; a pair of upper rails extending from a vehicle body along a longitudinal direction of the vehicle, each rail of the pair of upper rails is secured to a respective deflector of the pair of deflectors at the intermediate portion by a mount; the intermediate portion of each deflector includes an access opening extending therethrough; each rail of the pair of upper rails are tubular and are secured to the respective deflector of the pair of deflectors by a bracket mounted on an upper portion of the respective deflector; each deflector of the pair of deflectors includes an upper shell and a lower shell connected to the upper shell; the bumper structure includes an arcuate body portion and end portions angled in a rearward direction from respective ends of the body portion, the front end of each deflector of the pair of deflectors is secured to a respective end portion; and a suspension system is secured to the left and right frame rails and secures wheels of the vehicle to the left and right frame rails, the pair of deflectors are located further toward the front of the vehicle relative to the suspension system.

In another form, the present disclosure provides a structural assembly for a vehicle that includes a left frame, a right frame, a cross beam, a bumper structure, a left deflector and a right deflector. The left frame rail and the right frame rail are spaced apart from each other and extend in a longitudinal direction of the vehicle. The cross beam extends in a transverse direction and connects the left and right frame rails to each other. The bumper structure extends in the transverse direction and is secured to front ends of the left frame rail and the right frame rail. The left deflector is angled in a forward direction of the vehicle from a location adjacent to the cross beam and includes a rear end secured to an outboard wall of the left frame rail and a front end secured to a left end of the bumper structure. The right deflector is angled in the forward direction of the vehicle from a location adjacent to the cross beam and includes a rear end secured to an outboard wall of the right frame rail and a front end secured to a right end of the bumper structure. Each deflector of the left and right deflectors has a variable cross-section and further includes an upper shell and a lower shell connected to the upper shell to define an internal cavity. At least one of an uppermost wall of the upper shell and a lowermost wall of the lower shell includes an opening to provide access to the internal cavity.

In variations of the structural assembly of the above paragraph, which may be implemented individually or an any combination: a left internal bulkhead is disposed within the left frame rail such the outboard wall of the left frame rail is disposed between the left internal bulkhead and the left deflector, and a right internal bulkhead is disposed within the right frame rail such that the outboard wall of the right frame rail is disposed between the right internal bulkhead and the right deflector; each bulkhead of the left internal bulkhead and the right internal bulkhead has a C-shape; and a left end plate is located at the outboard wall of the left frame rail and secured to the outboard wall of the left frame rail and the rear end of the left deflector, a right end plate is located at the outboard wall of the right frame rail and secured to the outboard wall of the right frame rail and the rear end of the right deflector.

In yet another form, the present disclosure provides a structural assembly for a vehicle that includes a left frame, a right frame, a cross beam, a bumper structure, a left deflector, a right deflector, a left internal bulkhead, a right internal bulkhead, a left end plate, and a right end plate. The left frame rail and the right frame rail are spaced apart from each other and extend in a longitudinal direction of the vehicle. The cross beam extends in a transverse direction and connects the left and right frame rails to each other. The bumper structure extends in the transverse direction and is secured to front ends of the left frame rail and the right frame rail. The left deflector is angled in a forward direction of the vehicle from a location adjacent to the cross beam and includes a rear end secured to an outboard wall of the left frame rail and a front end secured to a left end of the bumper structure. The right deflector is angled in the forward direction of the vehicle from a location adjacent to the cross beam and includes a rear end secured to an outboard wall of the right frame rail and a front end secured to a right end of the bumper structure. The left internal bulkhead is disposed within the left frame rail such the outboard wall of the left frame rail is disposed between the left internal bulkhead and the left deflector. The right internal bulkhead is disposed within the right frame rail such that the outboard wall of the right frame rail is disposed between the right internal bulkhead and the right deflector. The left end plate is located at the outboard wall of the left frame rail and is secured to the outboard wall of the left frame rail and the rear end of the left deflector. The right end plate is located at the outboard wall of the right frame rail and is secured to the outboard wall of the right frame rail and the rear end of the right deflector. Each deflector of the left and right deflectors has a variable cross-section and further includes an upper shell and a lower shell connected to the upper shell to define an internal cavity. An uppermost wall of the upper shell of each of the left and right deflectors includes an upper opening to provide access to the internal cavity and a lowermost wall of the lower shell of each of the left and right deflectors includes a lower opening to provide access to the internal cavity. The upper opening and the lower opening vertically aligned with each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
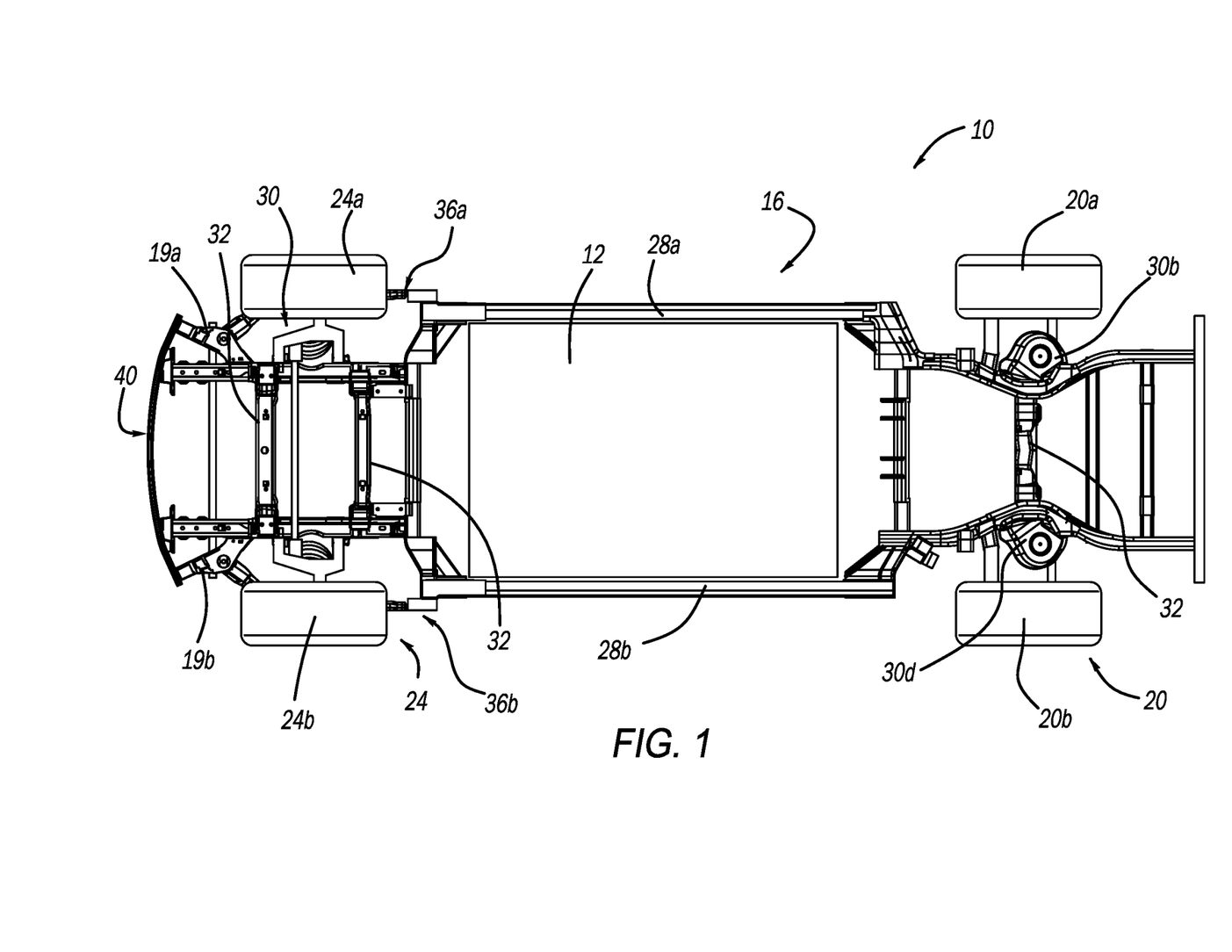
FIG. 1 is a schematic top view of a vehicle including a vehicle frame and a pair of deflectors according to the principles of the present disclosure.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. In still other examples, the vehicle 10 may be an internal combustion engine vehicle. The vehicle 10 may be a body-on-frame type of vehicle, a uni-body vehicle or another type of vehicle architecture.

Figure 2:
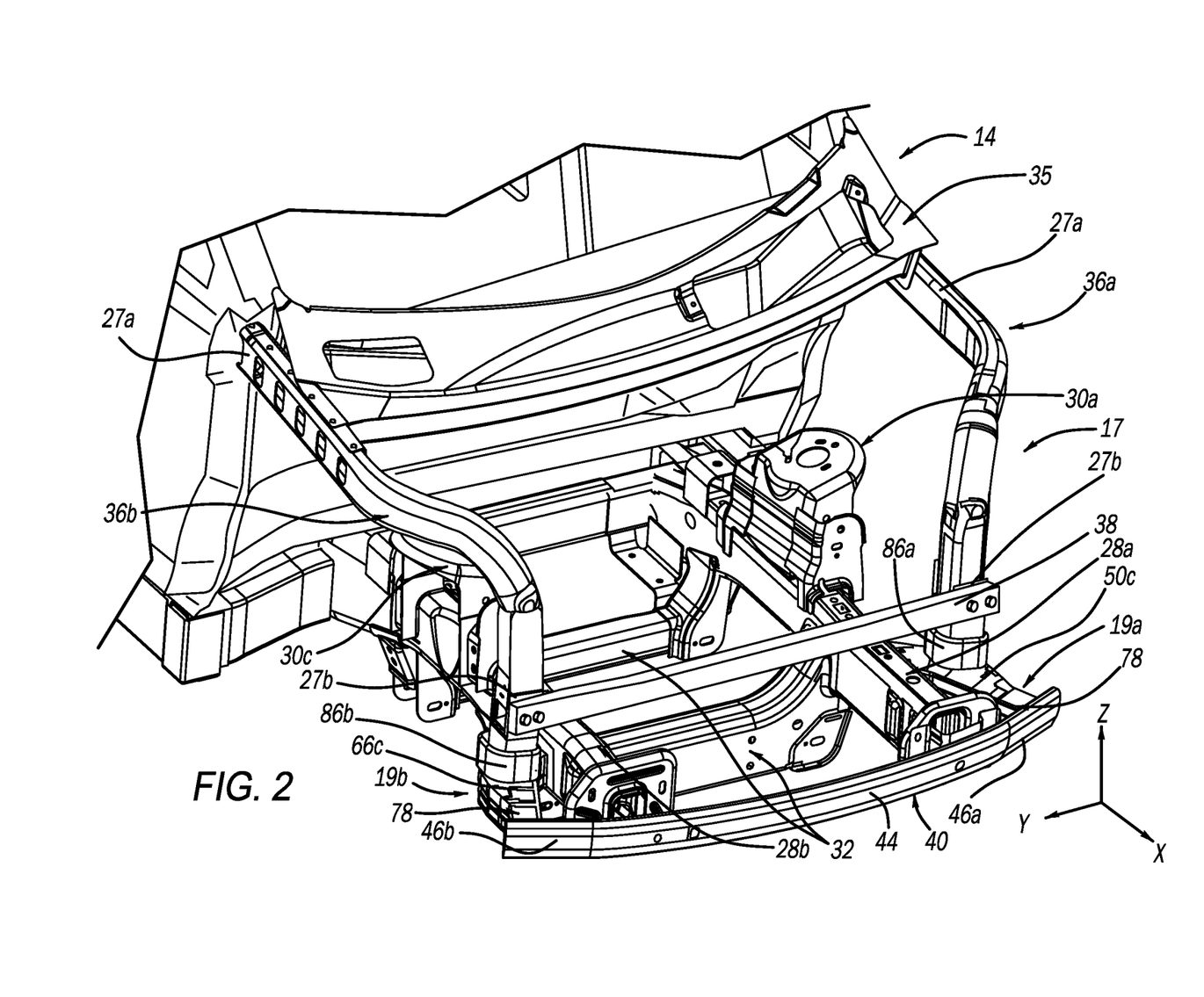
FIG. 2 is a perspective view of a portion of the vehicle of FIG. 1 including a vehicle body, the vehicle frame, a front end structure, and the pair of deflectors.
Figure 3:
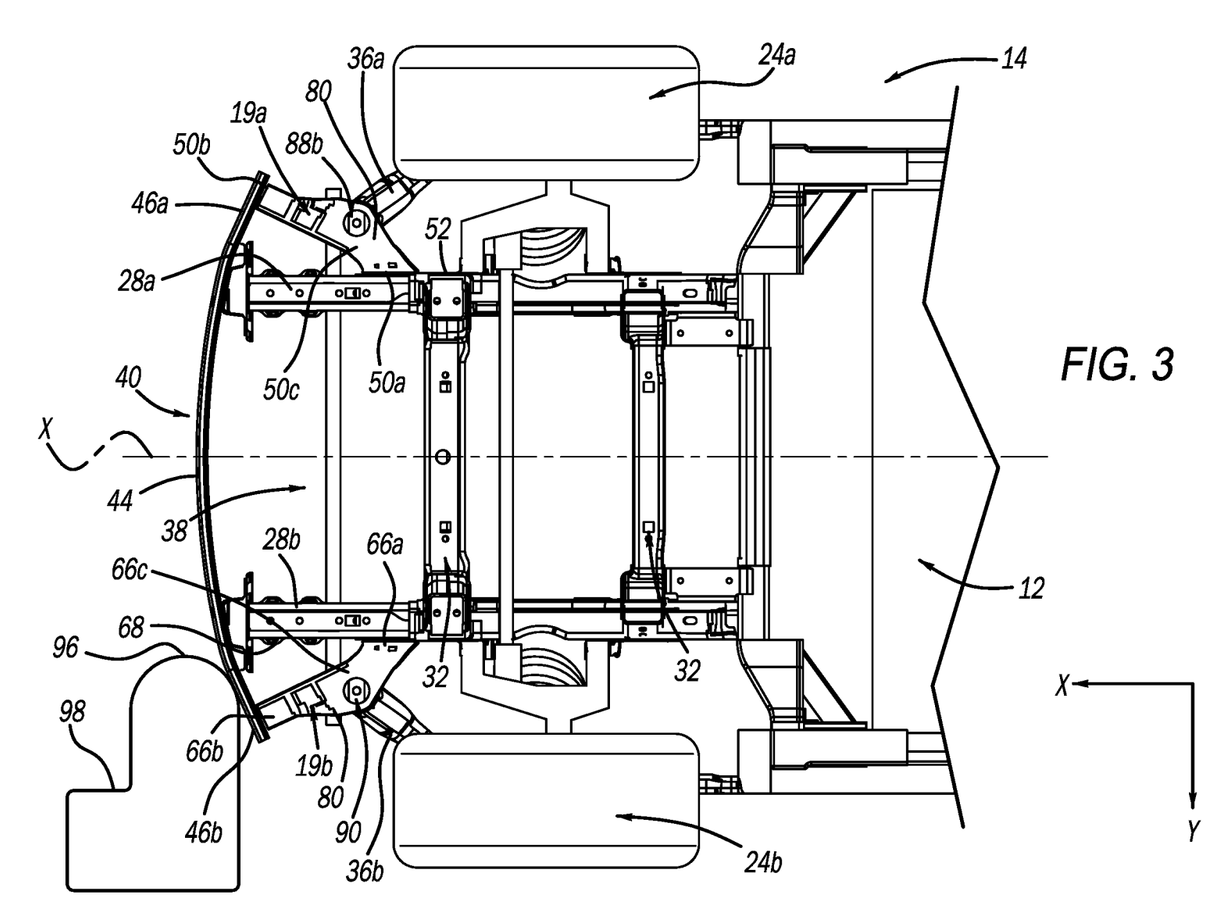
FIG. 3 is a bottom view of a front portion of the vehicle of FIG. 1 including the pair of deflectors and the vehicle frame.

With additional reference to FIGS. 2 and 3, the vehicle 10 includes a battery structure 12 (FIG. 1), a vehicle body 14 (FIG. 2), a vehicle frame 16, and a pair of deflectors 19a, 19b. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 16 and/or the vehicle body 14 by a plurality of attachment methods. In one example, the battery structure 12 may be secured to the vehicle frame 16 by a cover panel (not shown) covering the bottom of the battery structure 12 and attaching the battery structure 12 to the vehicle frame 16. In this way, the battery structure 12 is supported by the vehicle frame 16 and is remote from a passenger cabin and cargo compartments (not shown) of the vehicle 10, therefore, not occupying space that would otherwise be available for passengers or cargo. The battery structure 12 includes an outer support frame (not specifically shown). The battery structure 12 powers one or more motors to drive a set of drive wheels. For example, the battery structure 12 may power a rear motor (not shown) to drive rear wheels 20a, 20b of a set of rear wheels 20 via a rear axle and/or may power a front motor (not shown) to drive front wheels 24a, 24b of a set of front wheels 24 via a front axle.

The vehicle body 14 is separate (distinct) from and mounted on the vehicle frame 16. Stated differently, the vehicle body 14 is mounted on a plurality of body isolators (not shown) secured to the vehicle frame 16.

As shown in FIG. 2, a front-end structural assembly 17 is connected to the vehicle body 14 and is a supporting structure of vehicle components (not shown) and panels (not shown). The front-end structural assembly 17 includes, inter alia, a left upper tube 36a, a right upper tube 36b, and a cross beam or lower support tie bar 38. A cowl panel 35 spans a width of the vehicle 10 (i.e., extends in a transverse direction relative to a longitudinal direction of the vehicle 10) and may be secured to the upper tubes 36 of the front-end structural assembly 17. The cowl panel 35 partially supports a vehicle windshield (not shown) and dashboard (not shown). The cowl panel 35 also covers the space between the vehicle hood panel (not shown) and the vehicle windshield (not shown), thereby protecting unwanted debris and fluids from entering into vehicle systems such as the windshield wiper system, for example.

The left and right upper tubes 36a, 36b are typically each a single, unitary body that extends forward from a rear end 27a connected to the vehicle body 14 (i.e., each single, unitary body is connected to a hinge pillar of the vehicle body 14), then curves to angle inboard and forward before curving downward to extend downward and forward to a bottom end 27b. The lower support tie bar 38 is a separate unitary member that extends laterally between the two bottom ends 27b of the left and right upper tubes 36a, 36b and is configured to support one or more vehicle components (not shown). The lower support tie bar 38 is also connected to the two bottom ends 27b of the left and right upper tubes 36a, 36b.

With reference to FIGS. 1-3, the vehicle frame 16 is made of a metal material such as steel, for example, and may be manufactured by a roll forming process, for example. The vehicle frame 16 is the main supporting structure of the vehicle 10, to which various components are attached either directly or indirectly. For example, a suspension system 30 is secured to the vehicle frame 16, and secures the wheels 20, 24 (FIG. 1) of the vehicle 10 to the vehicle frame 16. The suspension system 30 provides a smooth ride by absorbing energy from various road bumps while driving, and assists the wheels 20, 24 to remain in contact with the road. In the example illustrated, the suspension system 30 includes a plurality of suspension mounts 30a, 30b, 30c, 30d that are configured to secure one or more components of the suspension system 30 to the vehicle frame 16. Mount 30a (FIG. 2) is secured to a front end of a longitudinal rail 28a of the vehicle frame 16 that is proximate a front end of the vehicle 10 and mount 30b (FIG. 1) is secured to a rear end of the longitudinal rail 28a of the vehicle frame 16 that is proximate a rear end of the vehicle 10. Similarly, mount 30c (FIG. 2) is secured to a front end of a longitudinal rail 28b of the vehicle frame 16 that is proximate a front end of the vehicle 10 and mount 30d (FIG. 1) is secured to a rear end of the longitudinal rail 28b of the vehicle frame 16 that is proximate a rear end of the vehicle 10. The suspension system 30 further includes various components such as upper and lower control arms, springs, shock absorbers, struts, and ball joints, for example.

The vehicle frame 16 includes the opposed longitudinal rails 28a, 28b and cross members 32. The rails 28a, 28b are spaced apart from each other and may establish a length of the vehicle frame 16. The rails 28a, 28b may angle inboard at a location proximate a rear end of the vehicle 10 and may angle at a location proximate a front end of the vehicle 10. The cross members 32 are structural members that extend in a transverse direction relative to a longitudinal direction of the vehicle 10 and connect the rails 28a, 28b to each other. The cross members 32 are also spaced apart from each other along a longitudinal direction of the vehicle 10.

One or more components of the suspension system 30 may secure a respective wheel 20a, 20b, 24a, 24c to the vehicle frame 16. That is, one or more components of the suspension system 30 may be secured to a respective rail 28a, 28b (or cross member 32) and may be secured to the respective wheel 20a, 20b, 24a, 24c. In the example illustrated, the vehicle frame 16 accommodates the battery structure 12 at a center portion or mid-section thereof. As used herein, the center portion or mid-section of the vehicle frame 16 means the region of the vehicle frame 16 that is between the pair of suspension mounts 30a, 30c proximate the front of the vehicle 10 and the pair of suspension mounts 30b, 30d proximate the rear of the vehicle 10. The battery structure 12 is secured to the vehicle frame 16 at the center portion. The plurality of body isolators (not shown) are secured to and along a respective rail 28a, 28b of the vehicle frame 16.

Figure 4:
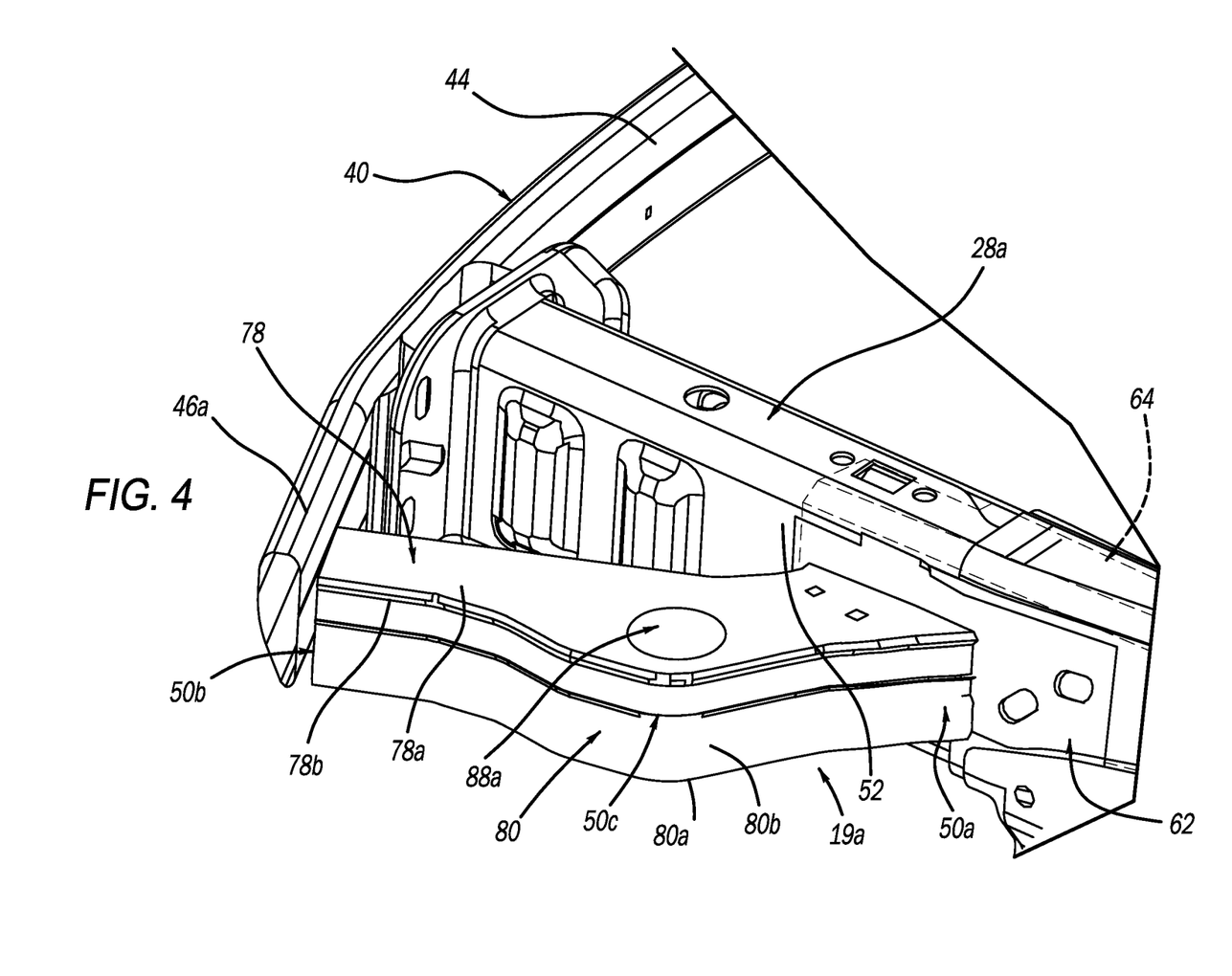
FIG. 4 is a perspective view of one deflector secured to a bumper structure and a rail of the vehicle frame of FIG. 1.

With reference to FIGS. 2-4, a bumper structure 40 extends in the transverse direction and is secured to front ends of the longitudinal rails 28a, 28b. The bumper structure 40 is located further toward a front end of the vehicle 10 than the lower support tie bar 38. The bumper structure 40 includes an arcuate body portion 44 and end portions 46a, 46b angled in a rearward direction from respective ends of the body portion 44.

The pair of deflectors 19a, 19b are manufactured using a stamping process, for example, and are made of a metal material such as aluminum or steel, for example. In some forms, the deflectors 19a, 19b may be made of a composite material, for example. The pair of deflectors 19a, 19b are located further forward than the pair of suspension mounts 30a, 30c proximate the front of the vehicle 10. The deflectors 19a, 19b may be made of a specific material and/or include geometric features (e.g., apertures) along its length to provide for certain impact modes. The pair of deflectors 19a, 19b are also angled in a forward direction of the vehicle 10 and are secured to the vehicle frame 16 and the bumper structure 40. That is, with reference to FIGS. 3-5, the deflector 19a includes a rear end 50a fixed to (i.e., welded to) an outboard wall 52 of the longitudinal rail 28a and a front end 50b fixed to (i.e., welded to) an inner surface of the end portion 46a of the bumper structure 40. In some forms, the front end 50b may be fixed directly to the inner surface of the end portion 46a. In other forms, the front end 50b may be fixed to the inner surface by a bracket (not shown). In the example illustrated, the rear end 50a is fixed to the outboard wall 52 of the longitudinal rail 28a by an end plate 62 (FIGS. 4 and 5) that is adjacent to one cross member 32 of the vehicle frame 16. In this way, loads may be transferred in the lateral direction during operation such as, by way of example, a small offset rigid barrier (SORB) test. In the example illustrated, the end plate 62 is adjacent to the cross member 32 located furthest in the forward direction of the vehicle 10. In some forms, the end plate 62 may be adjacent to any cross member located further forward than the pair of suspension mounts 30a, 30c proximate the front of the vehicle 10.

In the example illustrated, an internal bulkhead 64 (FIGS. 4 and 5) is disposed within the longitudinal rail 28a and may be fixed to the longitudinal rail 28a. In this way, the outboard wall 52 is located between the deflector 19a and the internal bulkhead 64. In the example illustrated, the internal bulkhead 64 may have a C-shape. In other forms, the internal bulkhead 64 may have a different shape. The internal bulkhead 64 reinforces the longitudinal rail 28a and facilitates lateral load transfer through the adjacent cross member 32 during operation such as during a SORB test. The internal bulkhead 64 may have a length that is greater than a length of the end plate 62.

With reference to FIG. 3, the deflector 19b includes a rear end 66a fixed to (i.e., welded to) an outboard wall 68 of the longitudinal rail 28b and a front end 66b fixed to (i.e., welded to) an inner surface of the end portion 46b of the bumper structure 40. In some forms, the front end 66b may be fixed directly to the inner surface of the end portion 46b. In other forms, the front end 66b may be fixed to the inner surface by a bracket (not shown). In the example illustrated, the rear end 66a is fixed to the outboard wall 68 of the longitudinal rail 28b by an end plate (not specifically shown) that is adjacent to one cross member 32 of the vehicle frame 16. In this way, loads may be transferred in the lateral direction during operation such as during a SORB test. The structure and function of the end plate may be similar or identical to the end plate 62 described above, and therefore, will not be described again in detail. An internal bulkhead (not specifically shown) may be disposed within the longitudinal rail 28b and may be fixed to the outboard wall 68 of the longitudinal rail 28b. The structure and function of the internal bulkhead may be similar or identical to the internal bulkhead 64 described above, and therefore, will not be described again in detail.

Figure 5:
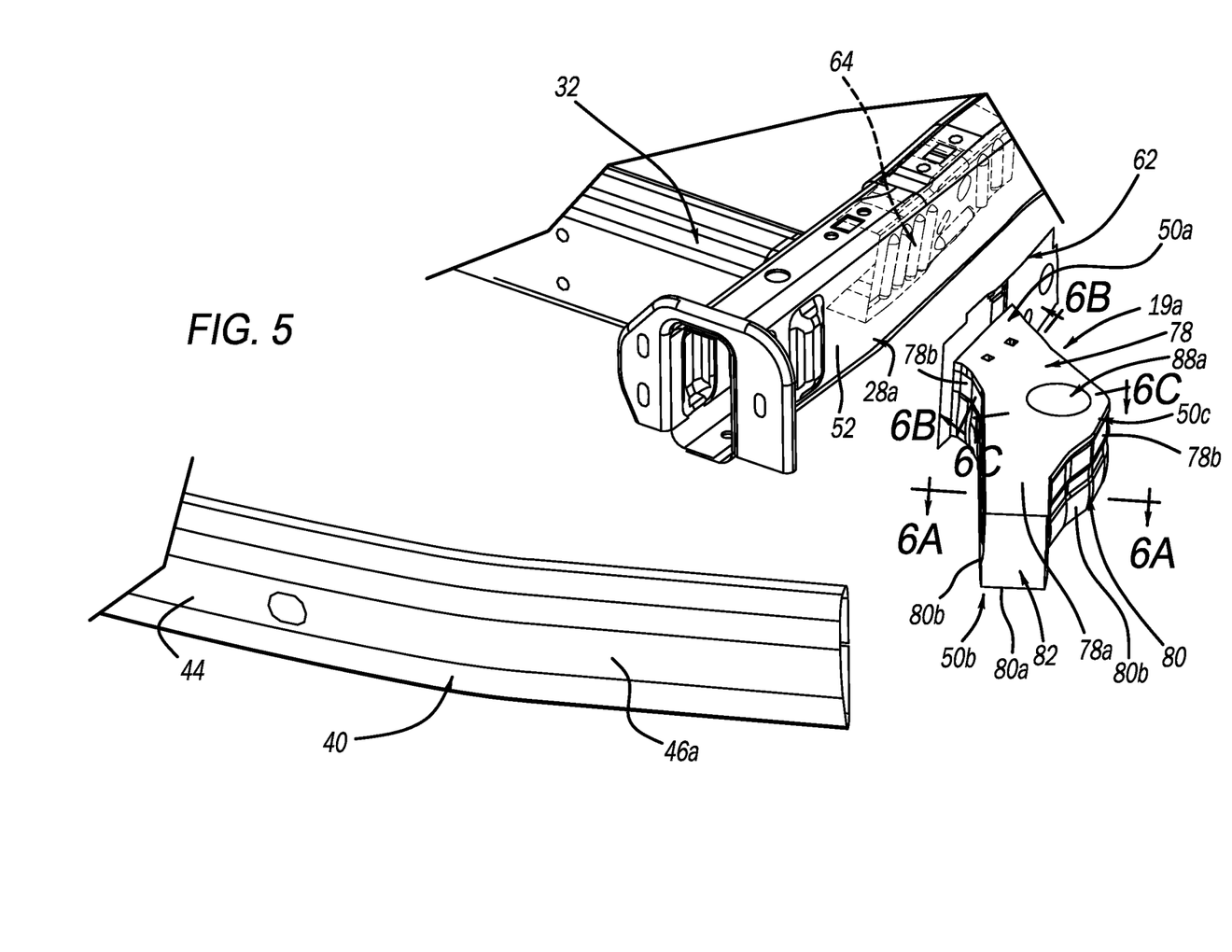
FIG. 5 is a perspective view of one deflector exploded from the bumper structure and the rail of the vehicle frame of FIG. 1.

With reference to FIGS. 3-5, each deflector 19a, 19b includes an upper shell 78 and a lower shell 80 that is connected to the upper shell 78. The upper shell 78 includes an upper body 78a and a pair of flanges 78b that extend downward from respective ends of the upper body 78a. Similarly, the lower shell 80 includes a lower body 80a and a pair of flanges 80b that extend upward from respective ends of the lower body 80a. The pair of flanges 80b are secured to the pair of flanges 78b of the upper shell 78 to form the deflector 19a, 19b having an internal cavity 82 (FIG. 5). In the example illustrated, the pair of flanges 80b of the lower shell 80 are secured to the pair of flanges 78b of the upper shell 78 by welding. It should be understood that the upper and lower shells 78, 80 may be secured to each other using any suitable attachment method such as mechanical fasteners and/or adhesives, for example. In some forms, each deflector 19a, 19b may be manufactured using an extrusion process, thus, being made of a single tubular body, for example.

Figure 6A:
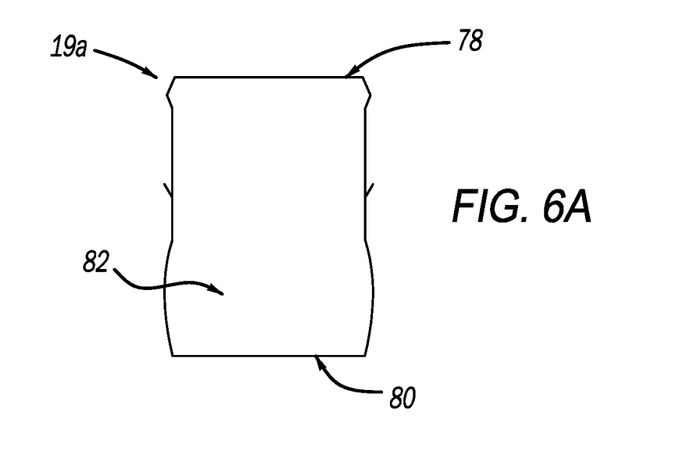
FIG. 6A is a cross-sectional view of the deflector taken along line 6A-6A of FIG. 5.
Figure 6B:
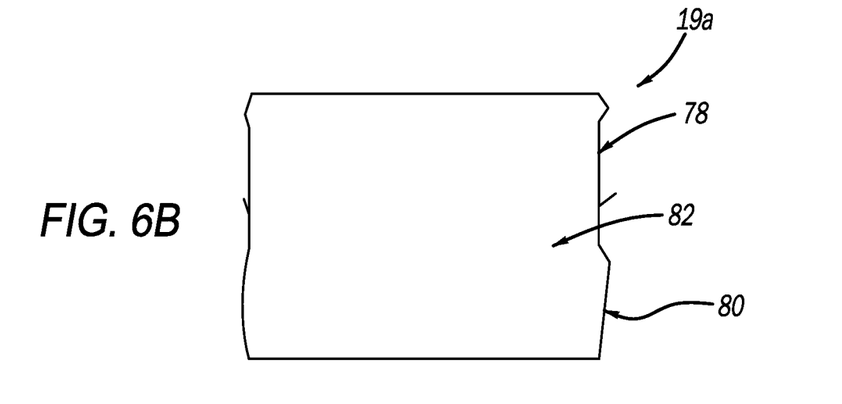
FIG. 6B is a cross-sectional view of the deflector taken along line 6B-6B of FIG. 5.
Figure 6C:
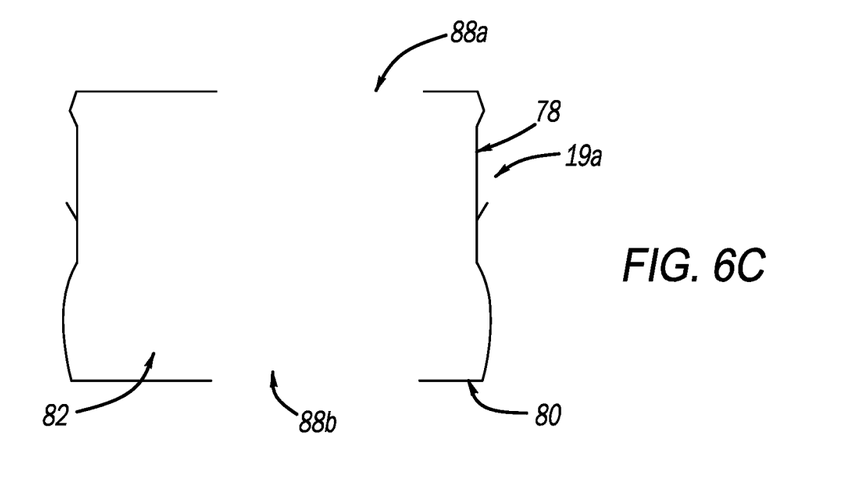
FIG. 6C is a cross-sectional view of the deflector taken along line 6C-6C of FIG. 5.

With reference to FIGS. 6A-6C, the front end 50b of the deflector 19a and the front end 66b of the deflector 19b have a first cross-sectional area (FIG. 6A; only deflector 19a shown in the figure), the rear end 50a of the deflector 19a and the rear end 66a of the deflector 19b have a second cross-sectional area (FIG. 6B; only deflector 19a shown in the figure), and an intermediate portion 50c of the deflector 19a and an intermediate portion 66c of the deflector 19b have a third cross-sectional area (FIG. 6C; only deflector 19a shown in the figure). The third cross-sectional area is greater than the first and second cross-sectional areas, and the second cross-sectional area is greater than the first cross-sectional area. In this way, each deflector 19a, 19b has a variable cross-section.

With reference to FIGS. 2 and 3, the upper tube 36a of the front-end structural assembly 17 is secured to the deflector 19a by a mount 86a mounted on the deflector 19a at the intermediate portion 50c. Similarly, the upper tube 36b of the front-end structural assembly 17 is secured to the deflector 19b by a mount 86b mounted on the deflector 19b at the intermediate portion 66c. In the example illustrated, the deflector 19a includes access openings 88a, 88b extending therethrough at the intermediate portion 50c and the deflector 19b includes access openings 90 extending therethrough at the intermediate portion 66c. That is, the opening 88a is formed in the upper shell 78 of the deflector 19a and the opening 88b is formed in the lower shell 80 of the deflector 19a and vertically aligned with the opening 88a. Similarly, the opening (not shown) is formed in the upper shell 78 of the deflector 19b and the opening 90 is formed in the lower shell 80 of the deflector 19b and vertically aligned with the opening formed in the upper shell 78. In this way, assembly of the upper tube 36a to the deflector 19a and assembly of the upper tube 36b to the deflector 19b is facilitated. In some forms, the upper tube 36a may be mounted to the deflector 19a at a different location of the deflector 19a (e.g., the rear end 50a or the front end 50b), and the upper tube 36b may be mounted to the deflector 19b at a different location of the deflector 19b (e.g., the rear end 66a or the front end 66b).

The structural assembly of the present disclosure includes the vehicle frame 16, the pair of deflectors 19a, 19b and the bumper structure 40. The pair of deflectors 19a, 19b including variable cross-sections allow different front-end structural assemblies to be secured to the pair of deflectors 19a, 19b. The pair of deflectors 19a, 19b being angled in a forward direction and secured to the bumper structure 40 and the vehicle frame 16 allows loads to be transferred in the lateral direction during operation such as during a SORB mode. The vehicle frame 16 including internal bulkheads reinforces the vehicle frame 16 and facilitates lateral load transfer through the vehicle frame 16 during operation such as during a SORB test.

Figure 7:
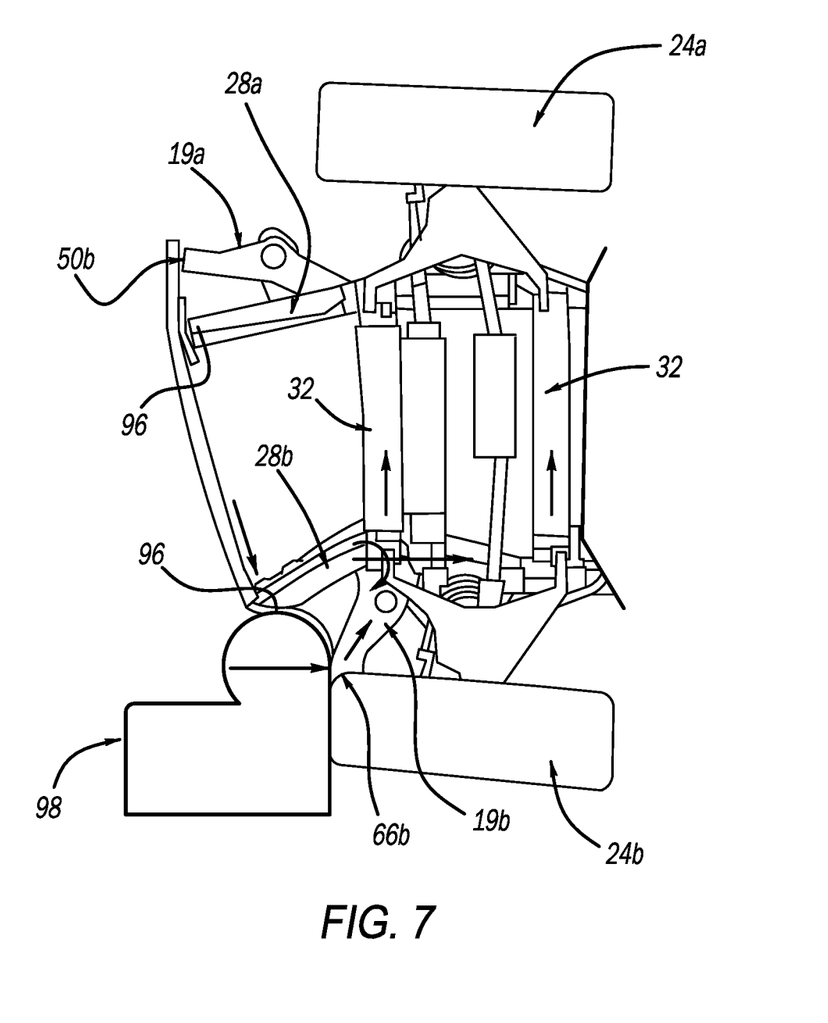
FIG. 7 is a bottom view of a portion of the vehicle frame and the pair of deflectors of FIG. 1 showing load paths during operation of the vehicle.

As shown in FIG. 7, the structural assembly of the present disclosure provides load paths for distributing loads during operation, such as by way of example, a small offset rigid barrier (SORB) test. The structural assembly distributes the loads (shown by the arrows) from the bumper structure 40 to a respective deflector 19a, 19b, to a respective longitudinal rail 28a, 28b, and then to the adjacent cross members 32. The unique location and attachment of these structural elements cause the loads from the SORB test to be distributed into the structural assembly and away from the battery structure 12. The unique location and attachment of these structural elements also allows lateral deflection of the vehicle 10 during operation such as during a SORB test. It should be understood that an edge 96 of the barrier 98 of the SORB test is offset to the vehicle centerline X by 25% of the vehicle 10 width. In the example illustrated, the barrier 98 is offset to the right side of the vehicle centerline X though in other configurations the barrier 98 can be offset to the left side of the vehicle centerline X while staying within the scope of this disclosure. The front end 66b of the deflector 19b in the example illustrated is located laterally outward in the Y direction at least an additional 160 millimeters (mm) from the edge 96 of the barrier 98. In this way, the front end of the deflector 19b contacts a flat surface of the barrier 98 during the SORB test.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a vehicle, the structural assembly comprising:
   a left frame rail and a right frame rail spaced apart from each other and extending in a longitudinal direction of the vehicle;
   a cross beam extending in a transverse direction and connecting the left and right frame rails to each other;
   a bumper structure extending in the transverse direction and secured to front ends of the left frame rail and the right frame rail; and
   a pair of deflectors, each deflector including a rear end secured to an outboard wall of a respective left and right frame rail and a front end secured to a respective end of the bumper structure, each deflector angled laterally outward in a forward direction of the vehicle from a location adjacent to the cross beam.

2. The structural assembly of claim 1, wherein each deflector of the pair of deflectors has a variable cross-section.

3. The structural assembly of claim 1, wherein the rear end of each deflector has a cross-sectional area that is greater than a cross-sectional area of the front end of each deflector.

4. The structural assembly of claim 3, wherein each deflector includes an intermediate portion disposed between the rear end and the front end, and wherein the intermediate portion has a cross-sectional area that is greater than the cross-sectional area of the front end and greater than the cross-sectional area of the rear end.

5. The structural assembly of claim 1, wherein each deflector includes an intermediate portion disposed between the rear end and the front end, and wherein the intermediate portion has a cross-sectional area that is greater than a cross-sectional area of the front end and greater than a cross-sectional area of the rear end.

6. The structural assembly of claim 5, further comprising a pair of upper rails extending from a vehicle body along a longitudinal direction of the vehicle, and wherein each rail of the pair of upper rails is secured to a respective deflector of the pair of deflectors at the intermediate portion by a mount.

7. The structural assembly of claim 5, wherein the intermediate portion of each deflector includes an access opening extending therethrough.

8. The structural assembly of claim 6, wherein each rail of the pair of upper rails are tubular and are secured to the respective deflector of the pair of deflectors by a bracket mounted on an upper portion of the respective deflector.

9. The structural assembly of claim 1, wherein each deflector of the pair of deflectors includes an upper shell and a lower shell connected to the upper shell.

10. The structural assembly of claim 1, wherein the bumper structure includes an arcuate body portion and end portions angled in a rearward direction from respective ends of the body portion, and wherein the front end of each deflector of the pair of deflectors is secured to a respective end portion.

11. The structural assembly of claim 1, further comprising a suspension system secured to the left and right frame rails and securing wheels of the vehicle to the left and right frame rails, and wherein the pair of deflectors are located further toward the front of the vehicle relative to the suspension system.

12. A structural assembly for a vehicle, the structural assembly comprising:
a left frame rail and a right frame rail spaced apart from each other and extending in a longitudinal direction of the vehicle;
a cross beam extending in a transverse direction and connecting the left and right frame rails to each other;
a bumper structure extending in the transverse direction and secured to front ends of the left frame rail and the right frame rail; and
a left deflector and a right deflector, the left deflector angled in a forward direction of the vehicle from a location adjacent to the cross beam and including a rear end secured to an outboard wall of the left frame rail and a front end secured to a left end of the bumper structure, the right deflector angled in the forward direction of the vehicle from a location adjacent to the cross beam and including a rear end secured to an outboard wall of the right frame rail and a front end secured to a right end of the bumper structure, wherein each deflector of the left and right deflectors has a variable cross-section and further includes an upper shell and a lower shell connected to the upper shell to define an internal cavity, at least one of an uppermost wall of the upper shell and a lowermost wall of the lower shell including an opening to provide access to the internal cavity.

13. The structural assembly of claim 12, further comprising a left internal bulkhead disposed within the left frame rail such the outboard wall of the left frame rail is disposed between the left internal bulkhead and the left deflector, and a right internal bulkhead disposed within the right frame rail such that the outboard wall of the right frame rail is disposed between the right internal bulkhead and the right deflector.

14. The structural assembly of claim 13, wherein each bulkhead of the left internal bulkhead and the right internal bulkhead has a C-shape.

15. The structural assembly of claim 12, further comprising a left end plate and a right end plate, the left end plate located at the outboard wall of the left frame rail and secured to the outboard wall of the left frame rail and the rear end of the left deflector, the right end plate located at the outboard wall of the right frame rail and secured to the outboard wall of the right frame rail and the rear end of the right deflector.

16. The structural assembly of claim 12, wherein the rear end of each deflector of the left and right deflectors has a rear cross-sectional area that is greater than a front cross-sectional area of the front end of each deflector of the left and right deflectors.

17. The structural assembly of claim 12, wherein each deflector of the left and right deflectors includes an intermediate portion disposed between the rear end and the front end, and wherein the intermediate portion has a cross-sectional area that is greater than a cross-sectional area of the front end and greater than a cross-sectional area of the rear end.

18. The structural assembly of claim 17, further comprising a pair of upper rails extending from a vehicle body along a longitudinal direction of the vehicle, and wherein each rail of the pair of upper rails are secured to a respective deflector of the left and right deflectors at the intermediate portion.

19. The structural assembly of claim 12, further comprising a suspension system secured to the left and right frame rails and securing wheels of the vehicle to the left and right frame rails, and wherein each deflector of the left and right deflectors are located further toward the front of the vehicle relative to the suspension system.

20. A structural assembly for a vehicle, the structural assembly comprising:
a left frame rail and a right frame rail spaced apart from each other and extending in a longitudinal direction of the vehicle;
a cross beam extending in a transverse direction and connecting the left and right frame rails to each other;
a bumper structure extending in the transverse direction and secured to front ends of the left frame rail and the right frame rail;
a left deflector and a right deflector, the left deflector angled in a forward direction of the vehicle from a location adjacent to the cross beam and including a rear end secured to an outboard wall of the left frame rail and a front end secured to a left end of the bumper structure, the right deflector angled in the forward direction of the vehicle from a location adjacent to the cross beam and including a rear end secured to an outboard wall of the right frame rail and a front end secured to a right end of the bumper structure;

a left internal bulkhead and a right internal bulkhead, the left internal bulkhead disposed within the left frame rail such the outboard wall of the left frame rail is disposed between the left internal bulkhead and the left deflector, the right internal bulkhead disposed within the right frame rail such that the outboard wall of the right frame rail is disposed between the right internal bulkhead and the right deflector; and a left end plate and a right end plate, the left end plate located at the outboard wall of the left frame rail and secured to the outboard wall of the left frame rail and the rear end of the left deflector, the right end plate located at the outboard wall of the right frame rail and secured to the outboard wall of the right frame rail and the rear end of the right deflector, wherein each deflector of the left and right deflectors has a variable cross-section and further includes an upper shell and a lower shell connected to the upper shell to define an internal cavity, an uppermost wall of the upper shell of each of the left and right deflectors includes an upper opening to provide access to the internal cavity and a lowermost wall of the lower shell of each of the left and right deflectors including a lower opening to provide access to the internal cavity, the upper opening and the lower opening vertically aligned with each other.

\* \* \* \* \*